United States Patent [19]
Lampert et al.

[11] Patent Number: 5,529,764
[45] Date of Patent: Jun. 25, 1996

[54] CO-PRODUCTION OF POTASSIUM SULFATE AND SODIUM SULFATE

[75] Inventors: Shalom Lampert, Maalot; Curt Holdengraber, Qiryat Tivon, both of Israel

[73] Assignee: Dead Sea Works Ltd., Beer Sheva, Israel

[21] Appl. No.: 348,115

[22] Filed: Nov. 28, 1994

[51] Int. Cl.$^6$ .................................................. C01D 5/00
[52] U.S. Cl. .............................................. 423/552; 423/199
[58] Field of Search ............................. 423/552, 199

[56] References Cited

U.S. PATENT DOCUMENTS

| | | | |
|---|---|---|---|
| 1,936,070 | 11/1933 | Ritchie et al. | 423/552 |
| 1,990,896 | 2/1935 | Connell | 423/552 |
| 4,215,100 | 7/1980 | Sokolov et al. | 423/552 |

FOREIGN PATENT DOCUMENTS

| | | | |
|---|---|---|---|
| 287511 | 3/1966 | Australia | 423/199 |
| 244540 | 12/1985 | Germany . | |
| 710945 | 1/1980 | U.S.S.R. | 423/552 |
| 806606 | 2/1981 | U.S.S.R. | 423/552 |
| 1557102 | 4/1990 | U.S.S.R. | 423/552 |
| 410830 | 5/1934 | United Kingdom | 423/552 |
| 439287 | 11/1935 | United Kingdom | 423/552 |
| 460281 | 1/1937 | United Kingdom | 423/552 |

OTHER PUBLICATIONS

Scherzberg, H.; Schmitz, R.; and Wholk, W.; Phosphorus and Potassium No. 178 (1992), 20–26.

*Primary Examiner*—Wayne Langel
*Attorney, Agent, or Firm*—Mark M. Friedman

[57] ABSTRACT

A process for producing potassium sulfate or potassium sulfate and sodium sulfate from potash and a sodium sulfate/water source, which includes: (a) subjecting a sodium sulfate source to conversion with potash in an aqueous medium to yield glaserite precipitate and a first mother liquor; (b) converting the glaserite precipitate with potash and water to produce a potassium sulfate precipitate and a second mother liquor; (c) returning the second mother liquor to step (a); (d) subjecting the first mother liquor to treatment, such as evaporative crystallization, such that a sodium chloride and sodium sulfate solids mixture or pure sodium chloride is precipitated in a third mother liquor; (e) subjecting the solids from step (d) to a sodium sulfate/water source to produce anhydrous sodium sulfate; and (f) returning the third mother liquor for conversion to potassium salts.

11 Claims, 2 Drawing Sheets

CO-PRODUCTION OF POTASSIUM SULFATE AND SODIUM SULFATE

FIELD AND BACKGROUND OF THE INVENTION

The present invention relates to processes for producing potassium and sodium sulfate, and, more particularly, to processes for producing potassium sulfate and sodium sulfate from potash and hydrated sodium sulfate.

Sodium Sulfate Production

Various processes are known for producing sodium sulfate from hydrated sources of sodium sulfate. High-quality commercial grades of sodium sulfate are usually produced from Glauber's salt ($Na_2SO_4*10H_2O$). Natural Glauber's salt deposits ("mirabilite") exist in cold climates. Glauber's salt can also be obtained by cooling a natural brine, a solution obtained by solution-mining, or a process stream. The cooling is effected in ponds or in crystallizers (surface-cooled or vacuum-cooled).

Anhydrous sodium sulfate is typically produced from Glauber's salt by evaporative crystallization in a multiple-effect or mechanical vapor recompression (MVR) evaporator, by dehydration in a rotary dryer, or by melting followed by salting out with sodium chloride. Glauber's salt often contains insoluble matter which is unacceptable in high-grade anhydrous sodium sulfate, hence, dissolution, filtration (and auxiliary separation methods such as desliming), and evaporative crystallization operations are necessary to obtain such material. Alternatively, the Glauber's salt can be melted to produce low quality "salt cake" grade sodium sulfate. The saturated mother liquor is then filtered and evaporated to produce high-grade sodium sulfate.

Potassium Sulfate Production

In the production of potassium sulfate from potash and sodium sulfate, thermodynamic and economic constraints dictate that the potassium sulfate be produced in two stages. In conventional processes, these stages consist of:

1) Production of glaserite ($K_3Na(SO_4)_2$) from sodium sulfate, potash, and Stage 2 liquor;

2) Production of potassium sulfate from potash, water, and glaserite from Stage 1.

The mother liquor produced in Stage 1 contains substantial quantities of dissolved potassium and sulfate, which generally warrants a recovery operation. The currently-known processes differ primarily in the scheme used to retrieve these potassium and sulfate values.

Several processes ("Type I") take advantage of the different solubility behaviors of potassium chloride, sodium chloride, and sodium sulfate/Glauber's salt at high and low temperatures. The effluent from Stage 1, of composition 'a' (at 25° C.) (see FIG. 1b), is cooled to about 0° C. (FIG. 1a), precipitating Glauber's salt for reuse and possibly some sodium chloride, depending on the water balance in the system. The potassium values are concentrated in the aqueous phase. After separation, the solution is evaporated at high temperature, yielding sodium chloride and further concentrating the potassium ions in solution. The sodium chloride is removed as the process by-product, and the hot liquor is cooled, precipitating potassium as KCl and/or glaserite, which is subsequently returned to the reaction stages. Alternatively, the hot brine is reacted with Glauber's salt recovered from the cooling crystallization stage to produce a glaserite suspension, which is returned to Stage 1.

Other cyclic processes ("Type II") utilize the different solubility behaviors of potassium chloride and sodium chloride at high temperatures. The quantity of water added to the reaction stages is set such that glaserite and solution 'b' (at 25° C.) are produced in Stage 1 (FIG. 1b). The glaserite is then reacted with potash and water to produce the potassium sulfate product and a liquor of composition 'c'. The liquor is returned to Stage 1. The effluent liquor from Stage 1 is evaporated at high temperatures (75°–110° C.), producing pure NaCl, and the end liquor is returned to Stage 1.

It must be emphasized that the production of potassium sulfate from potash and sodium sulfate is a low value-added process, even when the sodium chloride by-product can be marketed. The multi-stage processes described above are capital-intensive and energy-intensive.

The Type I processes are particularly complex, requiring a large number of unit operations. These include 4 to 6 filtration steps, not including filtration of the washed potassium sulfate product. Moreover, cooling crystallization is used to bring the temperature of the Stage 1 effluent to 0° C. The heat of crystallization of Glauber's salt, which is substantial (18.4 kcal/M), must also be removed at low temperatures. The cooling and heating costs associated with this stage coupled with expensive equipment (crystallizers, heat exchangers, coolant system, etc.) are a serious disadvantage.

The Type II processes have no cooling stage below ambient conditions. However, the process has an inordinately-large recycle stream (~10 tons/ton $K_2SO_4$ produced), which increases energy consumption. The low ratio of water evaporated to throughput in the evaporative crystallization stage drastically reduces the natural slurry density, requiring large crystallizers and/or more sophisticated crystallization technology.

Although Glauber's salt is a relatively inexpensive source of sodium sulfate, the additional water from the Glauber's salt decreases the conversion in the reaction stages and increases the sulfate composition of the Stage 1 effluent. Some cyclic processes cannot be operated using Glauber's salt while others require additional unit operations (e.g., evaporation). To date, no process using Glauber's salt has been realized commercially.

Another inexpensive source of sodium sulfate is aqueous sodium sulfate. However, the water-to-sodium sulfate ratio in aqueous sodium sulfate is higher than that of Glauber's salt, such that the problem of excess water worsens considerably. No cyclic processes using aqueous sodium sulfate as the raw material have been devised heretofore.

There is thus a widely recognized need for, and it would be highly advantageous to have, a process for producing potassium sulfate from sodium sulfate which would be more efficient and more economical than heretofore known.

SUMMARY OF THE INVENTION

According to the present invention there is provided a process for producing potassium sulfate or potassium sulfate and sodium sulfate from potash and a sodium sulfate/water source, comprising the steps of (a) subjecting a sodium sulfate source to conversion with potash in an aqueous medium to yield glaserite precipitate and a first mother liquor; (b) converting the glaserite precipitate with potash and water to produce a potassium sulfate precipitate and a second mother liquor; (c) returning the second mother liquor to step (a); (d) subjecting the first mother liquor to treatment such that a sodium chloride and sodium sulfate solids mixture or pure sodium chloride is precipitated in a third mother liquor; (e) subjecting the solids from step (d) to a sodium sulfate/water source to produce anhydrous sodium sulfate; and (f) returning the third mother liquor for conversion to potassium salts.

According to further features in preferred embodiments of the invention described below, the source of sodium sulfate is Glauber's salt, semi-anhydrous sodium sulfate, i.e., a mixture of sodium sulfate and Glauber's salt or partially hydrated sodium sulfate, or any sodium sulfate solution which can yield sodium sulfate in the presence of sodium chloride, such as vanthoffite solution.

The present invention allows the use of inexpensive and available sources of sodium sulfate. The invention takes advantage of the fact that the solubility behavior of potassium chloride differs greatly with the solubility behaviors of sodium chloride and sodium sulfate with changing temperature. With increasing temperature, the solubility of potassium chloride is greatly increased, whereas the solubility of sodium chloride rises only slightly, and that of sodium sulfate decreases or remains constant.

The present invention also makes use of the fact that the solubility of sodium sulfate decreases with increasing concentration of sodium chloride. Thus, sodium chloride/sodium sulfate solid mixture produced at high temperature can be added to the sodium sulfate feed source, such that the sodium chloride is completely dissolved. This decreases the solubility of sodium sulfate, whereby anhydrous sodium sulfate is precipitated out of solution as the only stable solid phase. Thus, the raw material is converted to anhydrous sodium sulfate, and the sodium sulfate from the evaporation stage is recovered. The sodium sulfate can be used to produce potassium sulfate, and any excess material is a valuable co-product.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of processes for the co-production of potassium sulfate and sodium sulfate. The principles and operation of processes according to the present invention may be better understood with reference to the drawings and the accompanying description.

Figure 1:
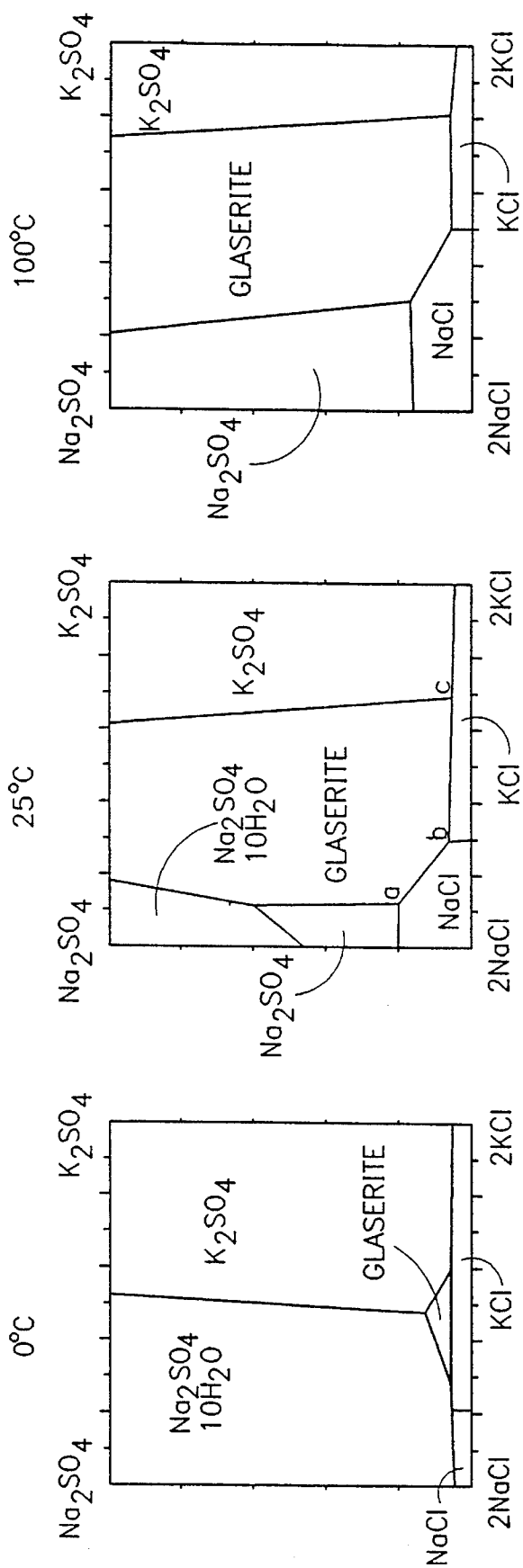
FIGS. 1a, 1b and 1c are solution phase diagrams for $Na_2SO_4/2NaCl/K_2SO_4/2KCl/H_2O$ system at 0°, 25° and 100° C., respectively.
Figure 2:
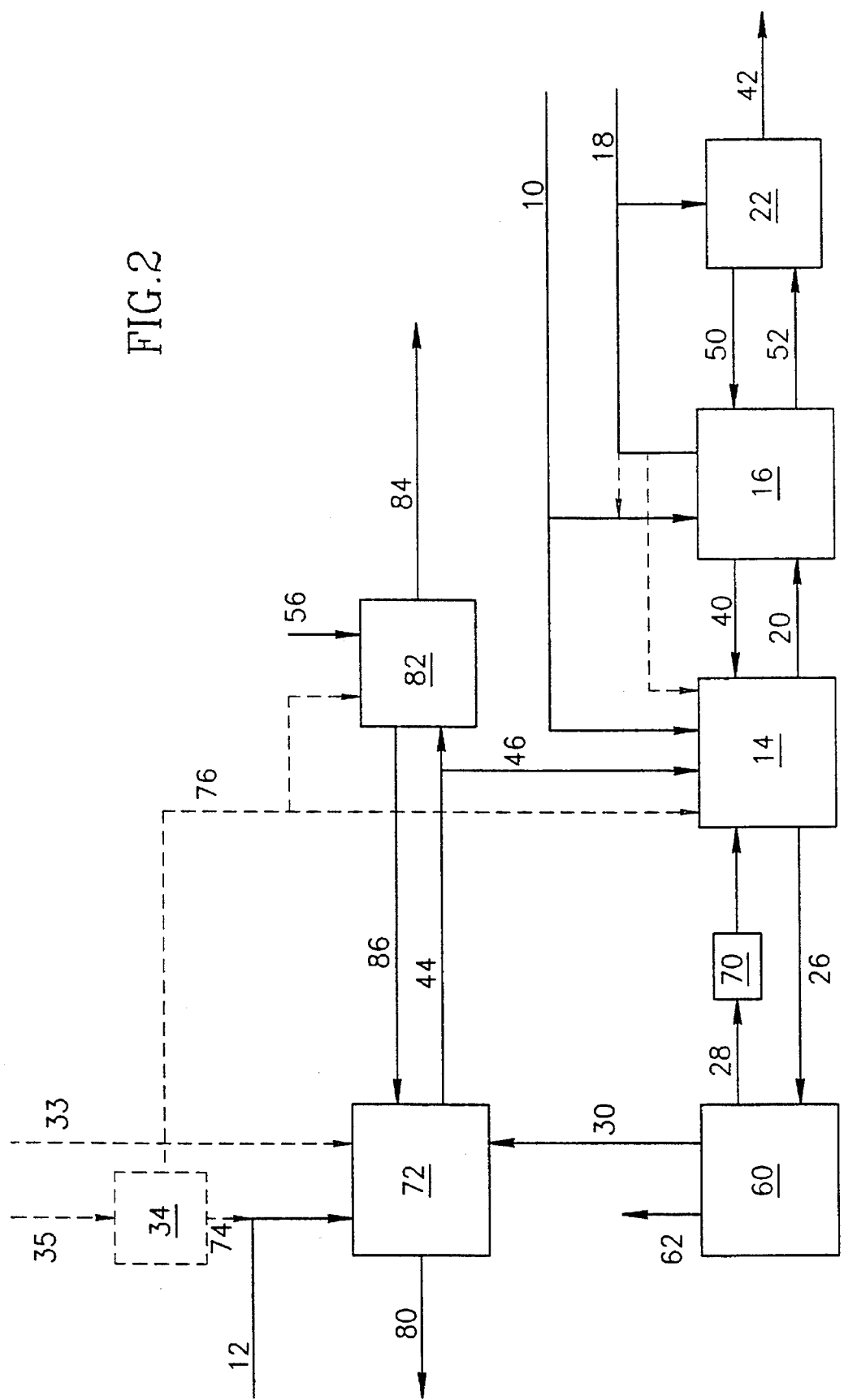
FIG. 2 is a block diagram schematically depicting processes according to the present invention.

Referring now to the drawings, FIG. 2 illustrates several embodiments of the present invention.

The proposed process is realized as follows: The conversion of potash 10 and sodium sulfate 46 and/or 76 to potassium sulfate 42 is carried out in two reaction stages. In the first stage, or glaserite production stage, 14, the reaction can be effected at 15°–100° C. But, while reaction kinetics and crystal growth rate improve with increasing temperature, equilibrium data show a decrease in conversion with increasing temperature, and energy costs increase. As a result, operating at near-ambient conditions (20°–40° C.) is optimal.

Potash 10, sodium sulfate 46 and/or 76, stream 28 from the recovery stage (described below), and brine 40 from the glaserite decomposition stage (described below) are introduced. The sodium sulfate source is primarily or exclusively anhydrous sodium sulfate, but some Glauber's salt and/or aqueous sodium sulfate can be added (not shown). The term 'potash' is meant to indicate any potassium chloride containing material including, for example, sylvinite.

In the first stage 14 the sodium sulfate and potash dissolve, generating a supersaturation with respect to glaserite, such that glaserite is precipitated. The system can also be supersaturated with respect to sodium chloride, such that some sodium chloride is co-precipitated. The slurry is dewatered and delivered 20 to the glaserite decomposition stage 16. The mother liquor 26 has the following composition in weight %: potassium: 2.5–6; sodium: 7.5–10; chloride: 10–17; sulfate: 1.3–8; water: the balance. The mother liquor composition corresponds to the points on and above the NaCl/glaserite equilibrium line or to the points on and/or to the right of the $Na_2SO_4$/glaserite equilibrium line. The mother liquor, which contains substantial quantities of potassium and sulfate, is processed in the recovery stage which is described below.

The glaserite decomposition stage 16 is performed at 15°–60° C., with the preferred temperature range being 20°–40° C., due to the same considerations delineated in the first stage. Potash 10 and water 18 are introduced along with the stream 20 obtained from the first stage 14. The potash and glaserite solids dissolve, generating a supersaturation solely with respect to potassium sulfate, such that potassium sulfate is selectively precipitated. The maximum conversion is obtained when the mother liquor approaches the $KCl/K_2SO_4$/glaserite/$H_2O$ invariant point. The potassium sulfate slurry 52 is dewatered and washed 22. The wet product 42 is then dried. The mother liquor 40 removed from the reactor of the glaserite decomposition stage 16 is returned to the glaserite production stage 14; the spent washwater 50, however, can be used in the glaserite decomposition stage 16. Some or all of stages 14, 16 and 22 may be effected in a single countercurrent differential contactor.

The brine 26 produced in the production of glaserite 14 is evaporated 60 at 70°–130° C., with the preferred range being 95°–110° C., to remove water 62. If necessary, the brine can be filtered (not shown) prior to evaporation to remove any insoluble matter. The evaporation of water produces a supersaturation of sodium salts (sodium sulfate, sodium chloride, or both, depending on the operating temperature, feed brine composition, and the amount of water evaporated per unit feed). Care must be taken not to over-evaporate. When over-evaporation occurs, the additional precipitation of sodium salts drives the mother liquor composition to the $NaCl/Na_2SO_4$/glaserite/$H_2O$ invariant point, at which point the undesirable co-precipitation of glaserite occurs.

After a solid/liquid separation, the potassium-enriched brine 28 is cooled 70 and returned to the glaserite decomposition stage 14. The sodium salts 30 produced during the evaporative crystallization are subjected, in a suitable vessel 72, to a low-quality and/or water-containing source of sodium sulfate 12 such as aqueous sodium sulfate, Glauber's salt, vanthoffite, or similar, with the addition of water as necessary. Each of the above-referenced, alone or in combination is referred to hereinafter singly or collectively as "sodium sulfate/water source". The vanthoffite can readily be obtained by reacting sodium chloride with astrakanite.

In order to obtain a high quality anhydrous sodium sulfate product, the aqueous source of sodium sulfate can be filtered to remove insoluble impurities. Glauber's salt crystallized from clear brines is generally free of such impurities and can be added directly 33 to vessel 72. Alternatively, a Glauber's salt containing impurities 35 can first be melted in a suitable melter 34, with the aqueous phase 74 being filtered before being introduced to the stream 30, and the concentrated solids 76 being used to produce glaserite in the first reaction stage 14. Another alternative is to feed all or a portion of solid phase 76 directly into filtering and washing vessel 82.

The solid sodium chloride from stream 30 is not in equilibrium in the sulfate-rich medium 72, and dissolves. The dissolved sodium chloride reduces the solubility of sodium sulfate, such that sodium sulfate is precipitated. The sodium sulfate slurry 44 is filtered and washed 82 thoroughly with water or clear sodium sulfate solution 56 in countercurrent fashion to obtain a low-chloride sodium sulfate product 84, which is then dried. The spent wash 86 is fed into vessel 72. The effluent liquor 80 from vessel 72, containing under 20 mole % sulfate, is discharged, utilized in another process, or processed to produce high grade sodium chloride and sodium sulfate.

While the invention has been described with respect to a limited number of embodiments, it will be appreciated that many variations, modifications and other applications of the invention may be made.

What is claimed is:

1. A process for producing potassium sulfate or potassium sulfate and sodium sulfate from potash and a sodium sulfate/water source, comprising the steps of:

(a) subjecting a sodium sulfate source to conversion with potash in an aqueous medium to yield glaserite precipitate and a first mother liquor;

(b) converting said glaserite precipitate with potash and water to produce a potassium sulfate precipitate and a second mother liquor;

(c) returning said second mother liquor to step (a);

(d) evaporating said first mother liquor such that a sodium chloride and anhydrous sodium sulfate solids mixture is precipitated in a third mother liquor;

(e) subjecting said sodium chloride and anhydrous sodium sulfate solids mixture to a sodium sulfate/water source to produce pure anhydrous sodium sulfate; and (f) returning said third mother liquor for conversion to potassium salts.

2. A process according to claim 1, further comprising:

(g) returning the requisite amount of said anhydrous sodium sulfate to step (a) as raw material, with any excess material being removed as a co-product.

3. A process according to claim 1, wherein said sodium sulfate/water source includes aqueous sodium sulfate.

4. A process according to claim 1, wherein said sodium sulfate/water source includes Glauber's salt.

5. A process according to claim 1, wherein said sodium sulfate/water source includes semi-anhydrous sodium sulfate.

6. A process according to claim 1, wherein said sodium sulfate/water source includes vanthoffite.

7. A process according to claim 1, wherein the aqueous sodium sulfate is obtained by melting Glauber's salt or semi-anhydrous sodium sulfate, with the solid sodium sulfate produced in the melter being used as a raw material for step (a).

8. A process according to claim 1, wherein the aqueous sodium sulfate is obtained by melting Glauber's salt with the solids produced being removed as by-product, and the solid sodium sulfate produced from the aqueous sodium sulfate being used as raw material for step (a).

9. A process according to claim 1, wherein at least one of the sources of sodium sulfate source used in step (a) is low-quality salt-cake, such that at least part of the high-grade sodium sulfate produced can be removed as co-product.

10. A process according to claim 1, wherein said third mother liquor is subjected to conversion with Glauber's salt, wherein the reaction mixture is substantially cooled, and wherein glaserite is precipitated in a fourth mother liquor and recovered to step (a) and wherein the fourth mother liquor is subsequently evaporated according to step (d).

11. The process according to claim 1, wherein the conversion of said third mother liquor is effected in-situ in step (a) with the addition of Glauber's salt, such that glaserite is precipitated in said first mother liquor, and recovered to step (b) and wherein the first mother liquor is subsequently evaporated according to step (d).

* * * * *